US008664807B2

(12) United States Patent
Gilbert et al.

(10) Patent No.: US 8,664,807 B2
(45) Date of Patent: Mar. 4, 2014

(54) PLANAR TRI-MODE CAVITY

(75) Inventors: Roland A. Gilbert, Milford, NH (US);
Michael D. Blazej, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 483 days.

(21) Appl. No.: 12/985,877

(22) Filed: Jan. 6, 2011

(65) Prior Publication Data

US 2011/0163610 A1    Jul. 7, 2011

Related U.S. Application Data

(60) Provisional application No. 61/293,028, filed on Jan. 7, 2010.

(51) Int. Cl.
*H02K 7/14* (2006.01)
(52) U.S. Cl.
USPC ........... 307/149; 333/101; 333/113; 333/116; 333/136; 342/375; 342/372; 342/371; 342/434; 343/777; 343/778
(58) Field of Classification Search
USPC ........... 307/149; 342/375, 372, 359; 343/371; 333/126, 233, 136, 124, 34, 101, 109, 333/113, 6, 83
See application file for complete search history.

(56) References Cited

U.S. PATENT DOCUMENTS

| | | | | |
|---|---|---|---|---|
| 4,005,379 A * | 1/1977 | Lerner | ......................... | 333/136 |
| 4,446,463 A * | 5/1984 | Irzinski | ......................... | 342/371 |
| 4,924,196 A * | 5/1990 | Uyeda | ......................... | 333/101 |
| 4,929,955 A * | 5/1990 | Miles et al. | ................... | 342/371 |
| 6,590,531 B2 * | 7/2003 | McKinzie et al. | ............. | 342/375 |
| 2011/0122026 A1* | 5/2011 | DeLaquil et al. | ............. | 342/372 |
| 2012/0235768 A1* | 9/2012 | Hein et al. | ..................... | 333/136 |

* cited by examiner

*Primary Examiner* — Rexford Barnie
*Assistant Examiner* — Jagdeep Dhillon
(74) *Attorney, Agent, or Firm* — Sand & Sebolt; Joseph A. Sebolt; Daniel J. Long

(57) ABSTRACT

A system and method for distributing the power of an electromagnetic signal is presented. In one embodiment, a power distribution cavity includes, a planar cavity, input ports and output ports. The planar cavity is formed with a metallic sheet in the shape of a star pattern with a plurality of elongated star arms extending from a round center portion of the metallic sheet. The input ports are attached to the round center portion of the metallic sheet for receiving an input signal. The signals entering the cavity from the input ports creating independent resonant modes within the cavity that combine producing a tapered aperture distribution of signals at the output ports. The output ports are attached near to the outward ends of the elongated star arms. The planar cavity is thus configured to propagate electromagnetic fields at the output ports that were excited within the cavity by the input ports.

20 Claims, 8 Drawing Sheets

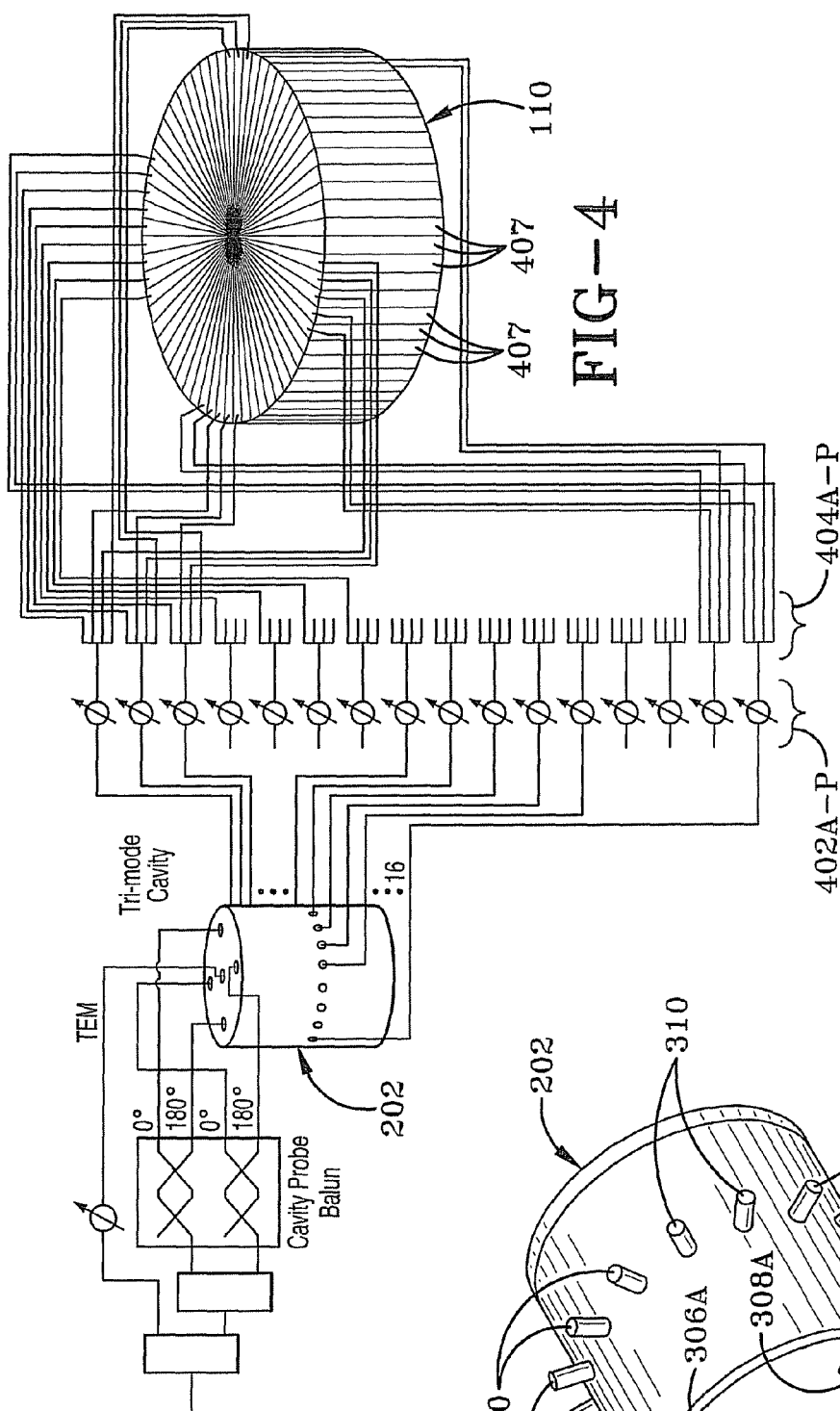
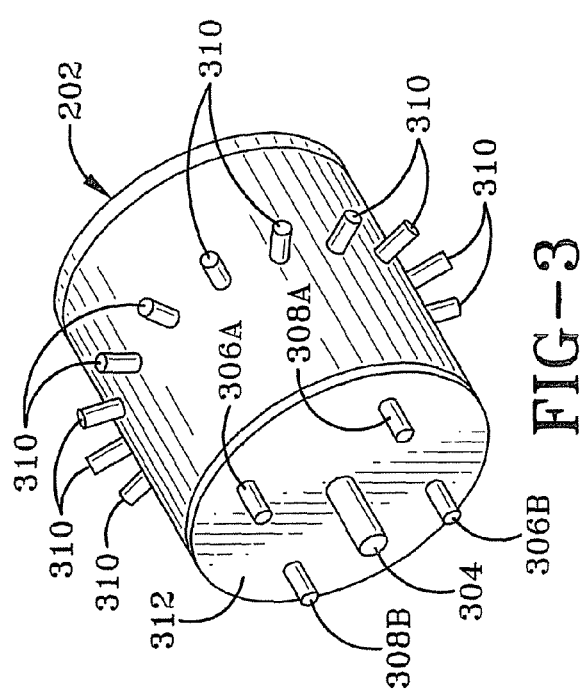
FIG-4
FIG-3

PLANAR TRI-MODE CAVITY

CROSS REFERENCE TO RELATED APPLICATION

This application claims priority from U.S. Provisional Application Ser. No. 61/293,028 filed Jan. 7, 2010; the disclosure of which are incorporated herein by reference.

STATEMENT OF GOVERNMENT INTEREST

The invention was made with United States Government support under Contract No. N00421-06-G-0004/YS08 awarded by The United States Navy. The United States Government has certain rights in this invention.

BACKGROUND OF THE INVENTION

1. Field of Invention

The current invention relates generally to apparatus, systems and methods for the transmission and reception of electromagnetic waves. More particularly, the apparatus systems and methods transmit and receive electromagnetic waves with an array of antennas. Specifically, the apparatus, systems and methods provide for transmitting or receiving electromagnetic waves based on signals combined coherently by the planar tri-mode cavity.

2. Description of Related Art

Beamforming is a signal processing technique used in sensor arrays for directional signal transmission or reception. Circular array systems are generally comprised of three major parts: 1) the beamformer, 2) the commutator, and 3) a circular array of radiating antenna elements. Beamformers often include a power divider that splits the input power into portions that are sent to each element of the antenna array so that a beam is radiated. The radiated beam is shaped by the aperture distribution taper which is the amplitude and phase of the power going to each element of the array. In this invention a tri-mode cavity is used to shape the aperture distribution. In a circular array, beamforming takes advantage of illuminating an arc of sequentially arrayed elements that is centered about the direction of signal transmission or reception. The beamformer then controls the phase and relative amplitude of the signal at each antenna element, in order to create a pattern of constructive and destructive interference in the wavefront. When the beam needs to be steered in a different direction, this aperture distribution needs to be commutated to a different set of array elements that point in that direction. Assuming that each output port of the trimode cavity beamformer is pre-wired to each antenna element of the array, then the aperture distribution needs to be transferred to the new set of elements. By changing the phase of the inputs to the tri-mode cavity, the same aperture distribution can be produced at a different set of consecutive output ports that feed the appropriate antenna elements in the array.

Prior tri-mode cavity radio frequency power distribution systems, such as those disclosed by David Lerner in U.S. Pat. No. 4,005,379, generally functioned in the region of L-band (1.030 GHz) and contained a tri-mode cavity of a generally cylindrical shape with a multitude of standard SMA or T connectors located around the circumference. Tri-mode cavities are often large, heavy, and expensive to manufacture.

In order for beamformers to function at higher GHz values it is necessary to find an alternative to the previously bulky structures. Simply scaling down these bulky structures creates overlap amongst the multitude of probe connectors when the probe connectors are arranged in the more confined area. Additionally, this decrease in size required for the tri-mode cavity to function at higher GHz levels necessitates more rigorous tolerances, and these tolerances make previous designs prohibitively, expensive to manufacture. Therefore, there exists a need for a better power distribution cavity.

SUMMARY OF THE INVENTION

The preferred embodiment of the invention a power distribution cavity includes a planar cavity, input ports and output ports. The planar cavity is formed with a metallic sheet in the shape of a star pattern with a plurality of elongated star arms extending from a round center portion of the metallic sheet. The input ports are attached to the round center portion of the metallic sheet for receiving an input signal. The output ports are attached near outward ends of the elongated star arms, wherein the planar cavity is configured to propagate electromagnetic fields excited at the input ports to the output ports.

In another configuration of the preferred embodiment, the power distribution cavity includes a sheet of dielectric material with the metallic sheet located on a top surface of the dielectric material. An additional sheet of metal forming a ground plane is located under the sheet of dielectric material. The sheet of dielectric material and the sheet of metal forming a ground plane extend outwardly beyond the outward ends of the elongated star arms. The ground plane and the metallic sheet are formed on a printed circuit board (PCB) and can be copper.

In one configuration of the preferred embodiment, the input ports include a transverse electromagnetic mode (TEM) input located near a center of the star pattern, configured to receive a TEM signal. The input port further includes a pair of transverse electric (TE) mode inputs to receive a pair of TE signals where one of the TE signals is a phase shifted version of the other TE signal.

In some configurations of the preferred embodiment, the elongated star arms extend outward from the round center portion of the metallic sheet in an oval pattern. The star ends can be spread out in equal circumferential distances from each other in the oval pattern. The star ends can be arranged in a circle with the star ends lying on the circle. In one configuration of the preferred embodiment, there are 16 elongated star arms.

An alternative embodiment of the invention is a cavity consisting of a bottom metallic sheet forming the ground and a top metallic sheet over a dielectric substate. The top sheet can take on geometries, such as circular, square, or triangular or any polygon, that allow electromagnetic signals to form electrical modes such as TEM, TE, and TM modes that combine within the cavity to form an appropriate signal excitation at the output ports to produce the desired aperture distribution. The input ports to the cavity are usually disposed symmetrically, although not necessarily, around the center of the cavity to excite the modes. The signals in each excitation mode then combine within the cavity and are picked up by the output ports which are usually also symmetrically disposed around the outside perimeter of the cavity. The transition between the cavity and the output ports of the trimode can be direct coupling via coaxial probes penetrating the top metallic sheet to make contact with the bottom metallic sheet, or gradual transition via a starburst pattern of metallic arms on top of the dielectric sheet which extend from the cavity circle to the probe tips as identified in the preferred embodiment.

A second embodiment of the invention includes a beam forming system. The beam forming system includes an array of antennas, a modal power divider, a tri-mode cavity, input and output ports on the tri-modal cavity and a commutator.

The modal power divider partitions a radio frequency (RF) input to generate divided RF signals to excite different RF modes within the tri-mode cavity. The tri-mode cavity comprises a planar metallic sheet shaped in a starburst pattern that has a center portion with a plurality of elongated star arms extending outward from the center portion. The input ports are connected to the center portion of the starburst pattern to receive the divided RF signals. The output ports are connected to generally pointed endpoints of outwardly extending ends of the elongated star arms and are configured to receive exited electromagnetic fields generated by the tri-mode cavity. The commutator phase shifts signals received from the output ports to produce shifted signals. The commutator additionally switches the shifted signals onto the array of antennas for transmission.

In some configurations of the second embodiment the beam forming system includes a dielectric sheet and the planar metallic sheet is a planar metal sheet deposited on one side of the dielectric sheet. The metallic sheet can be a copper sheet. The modal power divider can include a balun configured to generate a pair of transverse electric (TE) mode inputs from the RF input where the divided RF signals includes the pair of TE mode inputs. The balun preferably should include provisions within its circuitry to electrically isolate the TE modes from each other and from the TEM mode.

The preferred embodiment may be configured as a method of beam forming. The method divides a radio frequency (RF) signal to produce divided signals. RF power distributed signals are generated based, at least in part, on the divided signals. The RF power distributed signals are generated by inputting the divided signals into a center portion of a planar metallic sheet of metal shaped as a star with radially extending arms extending around the center portion. The RF power distributed signals are received at output ports located at ends of the radially extending arms. The method passes the RF power distributed signals through a commutator to produce commutated signals and then sends the commutated signals to an antenna array for transmission.

In one configuration of the method, the passing the RF power distributed signals through a commutator includes passing the RF power distributed signals through phase adjustment devices to produce phase adjusted signals. Additionally, the phase adjusted signals are passed through switches to produce the commutated signals. The switches can be single pole 4 throw (SP4T) switches or single pole by n throw (SPnT) depending on how many circular array elements there are.

In another configuration of the preferred embodiment, a transverse electromagnetic (TEM) signal and a pair of transverse electric (TE) mode signals can be produced. The divided signals include the TEM signal and the TE mode signals. The pair of TE mode signals can be generated with a balun.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 illustrates a prior art commutator assembly of an antenna beamformer.

FIG. 4 illustrates the wiring of a prior commutator assembly.

Similar numbers refer to similar parts throughout the drawings.

DETAILED DESCRIPTION

Figure 1:
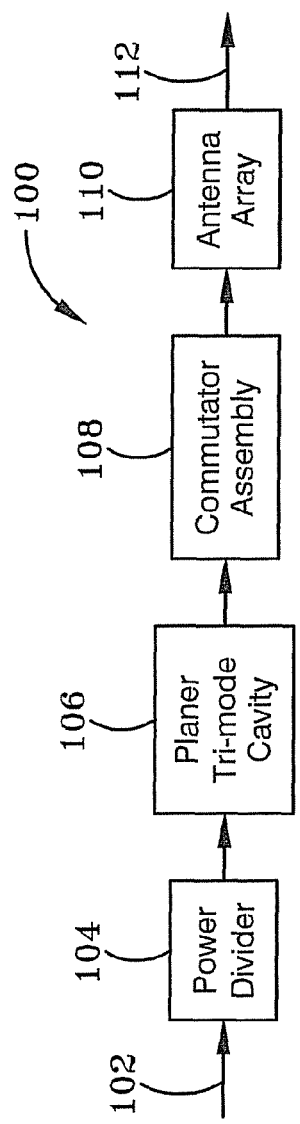
FIG. 1 illustrates a system architecture in which the preferred embodiment of a planar tri-mode cavity of a beamformer operates.

FIG. 1 illustrates the preferred embodiment of a planar tri-mode cavity 106 operating in a beamforming system 100. The system 100 receives a radio frequency (RF) signal 102 at a power divider 104 where it is partitioned into levels to excite the appropriate nodes at the planar tri-mode cavity 106. The planar tri-mode cavity 106 provides a tapered amplitude aperture distribution to a commutator assembly 108 phase shifts, switches and then provides a commutated signal to an antenna array 110. The antenna array 110 generates and transmits an electromagnetic beam based, at least in part, on the commutated signal. By reciprocity, the array can also receive a signal in its formed beam 112 and send the signals to a receiver 102. Henceforth, it will be understood that this beamformer and its components can both receive and transmit signals although the system is described in transmit terms only.

In the preferred embodiment, the shape of the center of the planar tri-mode cavity 106 of the beamformer is a starburst/sunburst shape as discussed in more detail later with reference to FIGS. 8 and 9. The starburst shape is about the same as that of the diameter of a traditional cylindrical cavity except reduced by the square root of the relative dielectric constant of the substrate on which the starburst pattern is printed. In the preferred embodiment, there are five input probes, four of which are TE mode input pairs fed by 0-180° hybrids. The center probe is the TEM mode input. The fields beneath the solid round center of the starburst and the ground plane of the planar tri-mode cavity 106 are the similar as between the tops of the two overlaying cylinders in the prior art cylindrical metallic tri-mode cavity. Instead of the fields radiating down the sides of the overlaying cylinders, the blended modal fields propagate out to the tips of the rays of the starburst shape of the planar tri-mode cavity 106. In the preferred embodiment, the tips are tapered to a width representing a 50Ω microstripline so that 50Ω connectors could be placed to pick up the voltage to send to the rest of the commutator assembly. The position of the TE and TEM input probes around the center of the starburst is dependent on several factors such as substrate thickness, dielectric constant, and probe impedance desired.

Even though the preferred embodiment of the cavity 6 is a star shaped pattern, other patterns and shapes can be used. For example, consider an alternative embodiment of the invention that a cavity 6 consisting of a bottom metallic sheet forming the ground and a top metallic sheet over a dielectric substate. The top sheet can take on geometries, such as circular, square, or triangular or any polygon, that allow electromagnetic signals to form electrical modes such as TEM, TE, and TM modes that combine within the cavity to form an appropriate signal excitation at the output ports to produce the desired aperture distribution. The input ports to the cavity are usually disposed symmetrically, although not necessarily, around the center of the cavity to excite the modes. The signals in each excitation mode then combine within the cavity and are picked up by the output ports which are usually also symmetrically disposed around the outside perimeter of the cavity. The transition between the cavity and the output ports of the trimode can be direct coupling via coaxial probes penetrating the top metallic sheet to make contact with the bottom metallic sheet, or gradual transition via a starburst pattern of metallic arms on top of the dielectric sheet which extend from the cavity circle to the probe tips as identified in the preferred embodiment.

Figure 2:
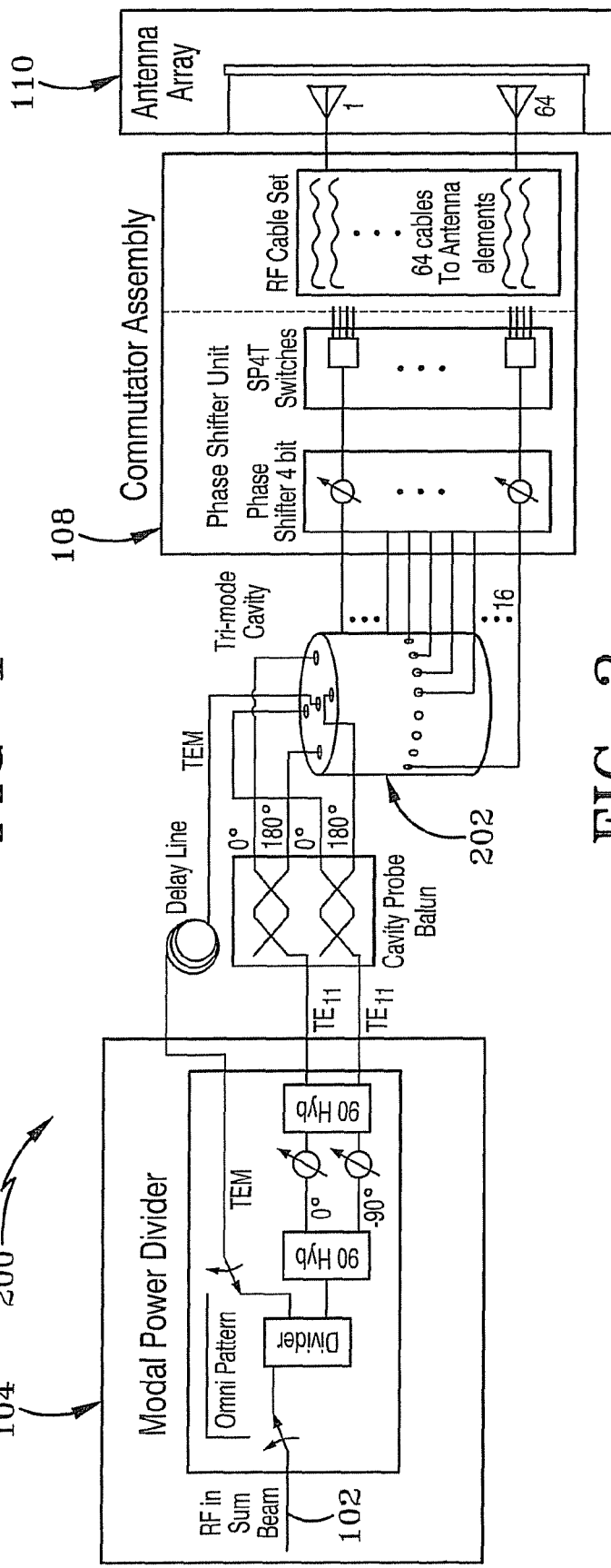
FIG. 2 illustrates a system architecture in which a prior art cylindrical tri-mode cavity operates.

In order to better appreciate the benefits of the greatly reduced size, complexity and cost of the planar tri-mode cavity 106 over a prior art cylindrical tri-mode cavity, the prior art tri-mode cavity 202 operating in the beamforming system 200 of FIG. 2 will be discussed before discussing further details of the preferred embodiment of the planar tri-mode cavity 106.

FIG. 3 illustrates the prior art tri-mode cavity 202 in more detail showing the input and output ports of the cylindrical cavity. A TEM mode input port 304 is centered on a front (top) plate 312 of the cavity 202. A first pair of TE mode input ports 306A, 306B are spaced above and below the TEM mode input port 304 and a second pair of TE mode input ports 308A, 308B are spaced on opposite sides of TEM mode input port 304

The TEM mode input port 304 allows an omni-directional pattern to be transmitted when all the input power is diverted to the TEM mode input port 304. When transmitting or receiving a beam, the input power is divided between the TEM mode input port 304 and the two TE mode exciters with phase shifters in line. The TE mode exciters each feed a 0°-180° hybrid whose output is directly coupled to the tri-mode cavity. The two sets of (+/−) hybrid outputs are located on tri-mode cavity 202 so that they are orthogonal (90°) to each other. Therefore, the TE modes are physically independent of the other. The TEM mode input port 304 feeds the cavity 202 like a coax cable.

The prior art tri-mode cavity 202 is comprised of a smaller cylinder inside another with a small space between the two cylinders. The inside cylinder is like the center of a coax cable. It is within this space that all the modes combine to feed the output probes. There are 16 probes 310 located around the circumference of the tri-mode cavity a small distance away from the top 312 of the cavity 202 where all the modes are excited. The probe connectors 310 are grounded to the external cylinder and center probe conductors of the probe connectors 310 penetrate the outer cylinder and cross the intercylinder space to connect to the inner cylinder. The fields of the excited modes propagate down the inner space to be combined at these output probes 310.

FIG. 4 illustrates how the output probes are connected to 16 phase shifters 402A-P that are connected to 16 single pole-four-throw switches 404A-P that are connected to a 64 element antenna array 407. The beamformer system 200 is designed to commutate the 16-element aperture distribution centered around any of the 64 elements on the antenna array ring 407. To accomplish this, the excitation produced by the tri-mode cavity 202 can also be commutated to any, of its 16 output ports 210. The signal from each corresponding port 210 is then routed through a corresponding SP4T switch which is wired to four corresponding sectors on the array ring 407.

In operation, the cavity modes are excited with the phase and amplitude levels needed to provide a tapered aperture illumination of the antennas 110. The array is a circular ring array with 64 antenna elements 407 arranged around the circumference of the ring. There are 16 consecutive elements along the ring that are illuminated by the output of the tri-mode cavity 202 at a given time that provides the ability produce a beam in a specified azimuthal direction. The illumination of the elements 407 is symmetrical, meaning that the amplitude and phase of the second set of eight elements is the mirror image of the illumination of the first set of eight elements. The aperture illumination is tapered such that the center two elements have the largest amplitude which decreases with a cosine raised to a power on a pedestal taper towards the outer elements of the aperture. This type of aperture distribution produces an antenna beam with very low sidelobes.

Figure 5:
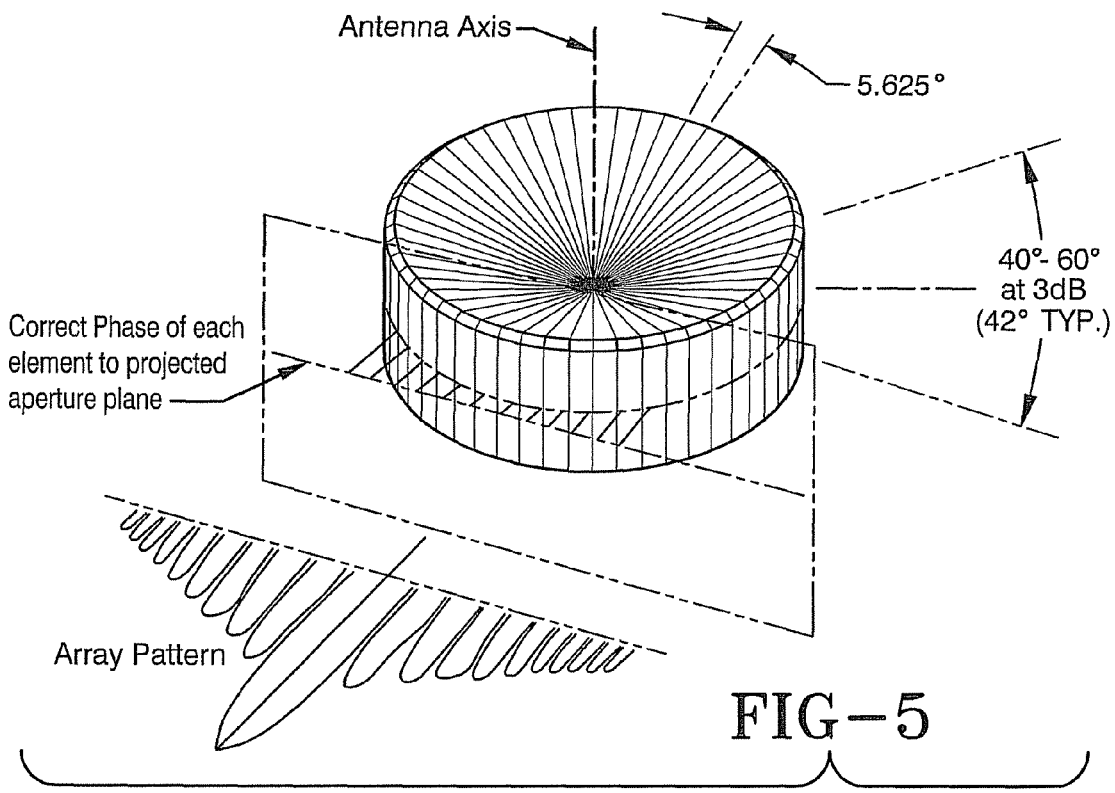
FIG. 5 illustrates the phase correction required in the aperture distribution to correct for the curvature of the array.

To compensate for the curvature of the antenna, a 16 4-bit phase shifters 402A-P are added between the outputs 310 of the prior art tri-mode cavity 202 and the SP4T switches 404A-P to add the phase delay needed to make the projected element pattern in FIG. 5 coherent with the other element patterns at the effective aperture plane. The 16 phase shifters 402A-P are also used to finely position the radiation pattern beam to 16 other positions of 0.316° increments in between the 5.625° arc between the consecutive array elements.

The prior art tri-mode cavity 202 is comprised of the cylindrical cavity and the feed balun top plate 312 as shown in FIG. 3. The TEM mode input enters the cavity at the center probe 304 that has an extending stem. The balun receives each of the two TE mode radio frequency excitations from the power divider and further divides each into two probes of equal power with opposite (+/− or 0°-180°) phase. The balun also provides high isolation between the TE and TEM mode by reflecting a high impedance at the probes within the tri-mode cavity for TEM mode excitation picked up by the TE mode probes.

The probes penetrate the topside 312 of the tri-mode cavity 202 as shown in FIG. 3. The space between the two cylinders creates a resonator whereby the probes can excite E-fields oriented perpendicularly between the top plates of the cavity. These fields are similar to those fields excited within a dual-polarized microstrip patch antenna. The E-field in the patch antenna is found by applying the following boundary conditions: 1) the patch is thin relative to wavelength, 2) the E-field only exists in the z-direction, 3) the H-field goes to zero at the edge of the patch, and 4) the radiation to free space occurs between the patch and the ground plane around the periphery of the patch.

The radial components of the E- and H-fields within the resonator 202 are given by the following equations:

$$E_z = \frac{jk_{mn}}{\omega\mu} E_o J_n(k_{mn}\rho)\cos(n\phi)$$

$$H_\phi = \frac{-j}{\omega\mu}\frac{\partial E_z}{\partial \rho} = \frac{\frac{jk_{mn}}{\omega\mu}E_o J_n}{\Box}(K_{mn}\rho)\cos(n\phi)$$

$$H_\rho = \frac{-j}{\omega\mu\rho}\frac{\partial E_z}{\partial \phi} = \frac{jn}{\omega\mu\rho}E_o J_n(K_{mn}\rho)\sin(n\phi)$$

Where:

$$k_{11} = \frac{2\pi\sqrt{\varepsilon_r}}{\lambda_0}$$

ρ is the radius from the center TEM probe outwards
n is the modal number (which in this case should be n=1)
φ is the angle rotating counterclockwise from the + side of the line formed by the +/− probe locations.
$k_{mn}$=is the modal wavenumber (in this case only $k_{11}$ is needed)

Figure 6:
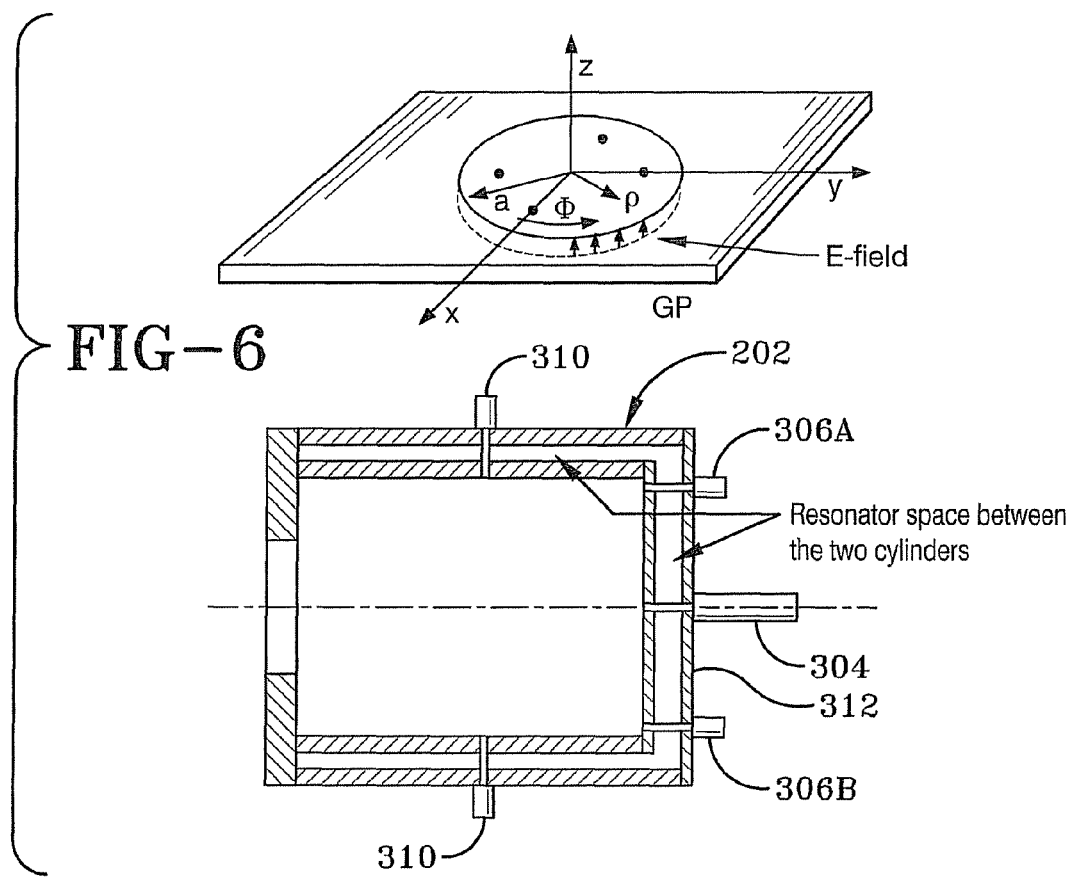
FIG. 6 illustrates the resonator space within a prior art tri-mode cavity where the fields are represented by those within a circular microstrip patch antenna.

The patch cavity model makes the assumption that the impedance at the edge of the patch is much larger than the impedance at the center of the patch. Therefore the $H_\phi$, term is assumed to go to zero at the patch's edge. This requires that the argument within the derivative of the Bessel function term be such that $J_1'(k\rho)$ goes to zero. Since kρ=1.84118, and we know $k_{11}$, then ρ=3.36 inches or d=6.72 inches. This is between the diameters of the inner (6.6 inch) and outer (7.2 inch) cylinders of the tri-mode cavity as seen in FIG. 6. The E-field excited by the TEM probe 304 is a constant everywhere pointing in the z-direction. Since the E-field due to the TE mode goes to zero at the center where the TEM probe 304 is located, the TEM probe 304 does not interference with the TE mode. The same is true with the TE probes, but for a different reason. When the TE input is split into +/− feedlines, one side is out of phase with the other. When the TE probes 306A-B, 308A-B pick up a TEM signal that is in phase, they arrive at the split point in the balun where they cancel each other. Therefore, they reflect very high impedance back to the probes within the cavity. Hence the TE probes 306A-B, 308A-B generally do not load down the TEM mode fields. The +/− TE probes 306A-B, 308A-B also serve a second purpose of suppressing the higher order modes that could be excited within the cavity 202, especially the even modes.

When the second set of TE input probes 308A-B is placed on a line orthogonal to the line formed by the two probes 306A-B of the first TE mode input, the new probes lie on the null E-field line of the first TE mode. Therefore these probes 308A-B have no impact on the first TE mode in the cavity or on the TEM mode. Therefore, the important result to recognize is that the total fields excited within the tri-mode cavity are obtained by summing each mode together. Since the radius remains constant at the edge of the resonant cavity 202, the only variable that changes is φ, the total E-field around the top edge of the cavity is given by:

$$E_z = E_{TEM} + E^{TE1}\cos(\phi) + E_{TE2}\cos(\phi-90°)$$

$$E_z = E_{TEM} + E_{TE1}\cos(\phi) + E_{TE2}\sin(\phi)$$

The field at the edge is assumed to be launched into the space between the sides of the tri-mode cavity cylinders propagating as if it were between parallel plates with the same gap separation. Extensive analysis was done to determine how much of any point along the top edge contributed to individual output probe locations along the sides of the tri-mode cavity. It was found that if the output probes 310 were far enough from the top edge and λ/4 from the bottom of the cavity, the fields at the probes could be estimated by the $E_z$ equation above with φ=probe position angle.

Figure 7:
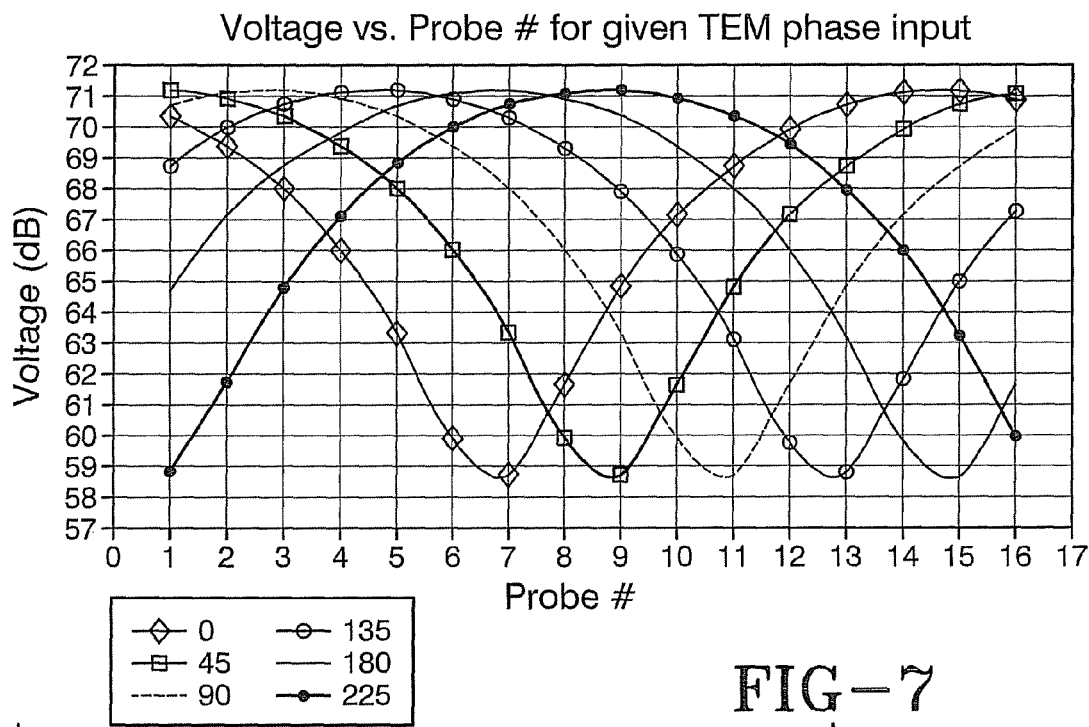
FIG. 7 shows a plot of un-normalized probe voltage (dB) versus probe # for six TEM excitations of different phases relative to the TE excitations of the prior art antenna beamformer. This figure also shows how the aperture distribution can be directed within the cavity to any of the output ports.

In order to verify this analysis, an HFSS EM model of the cavity 202 was constructed. The fields for a condition where modal excitation were related as $|E_{TEM}|=\sqrt{2}|E_{TE1}|$ and $E_{TE2}=jE_{TE1}$ were run in the model for various phases assigned to $E_{TEM}$. The amplitudes of the fields at each individual probe for different TEM mode phase excitations are plotted in FIG. 7. From the field equation for the tri-mode cavity 202, it can be seen that it is the relative phase difference between the modal excitations is the mechanism that steers the peak of the excitation to a particular probe.

Figure 10:
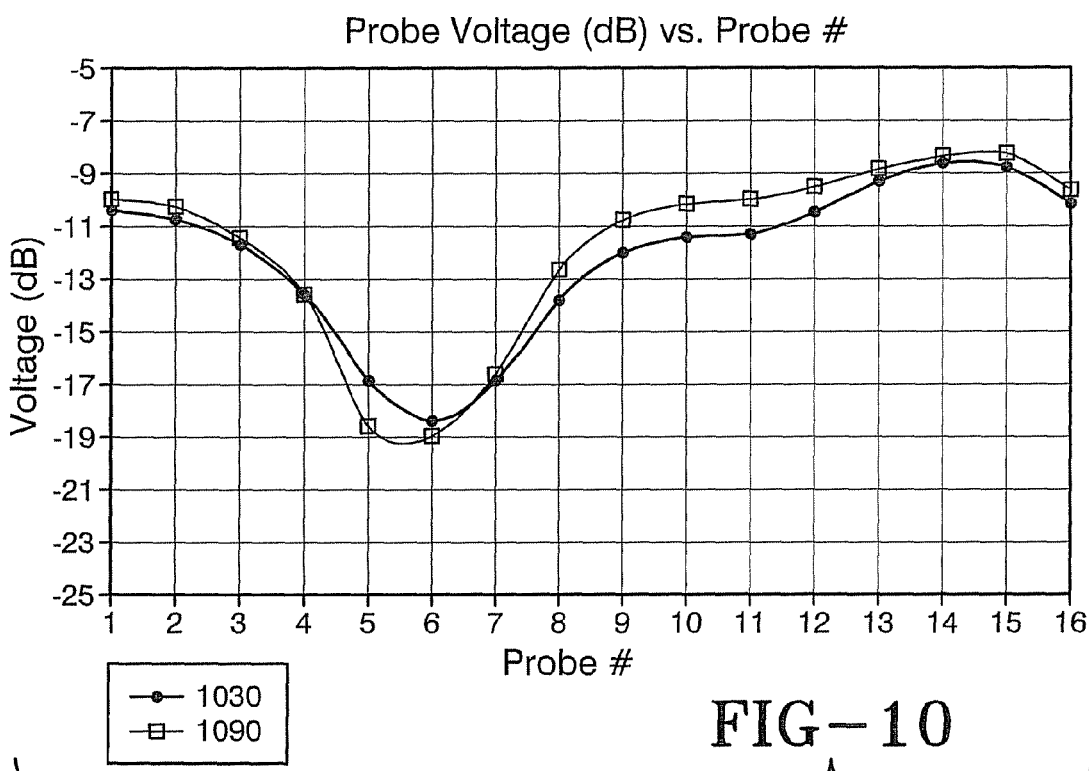
FIG. 10 illustrates a plot of the measured data from a planar microstripline tri-mode cavity of the preferred embodiment of the planar tri-mode cavity of the beamformer.
Figure 8:
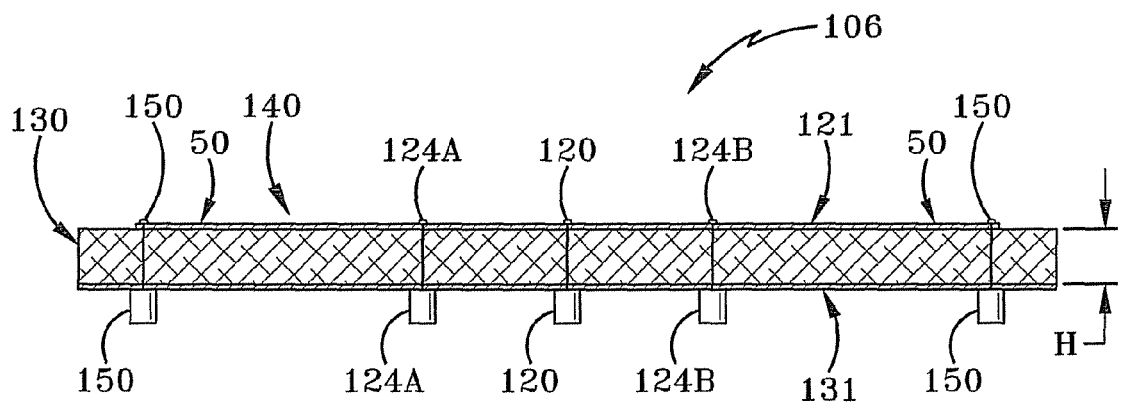
FIG. 8 is the cross-section view taken off of line 8-8 of FIG. 9 of a planar microstripline tri-mode cavity of the preferred embodiment of the antenna beamformer.
Figure 9:
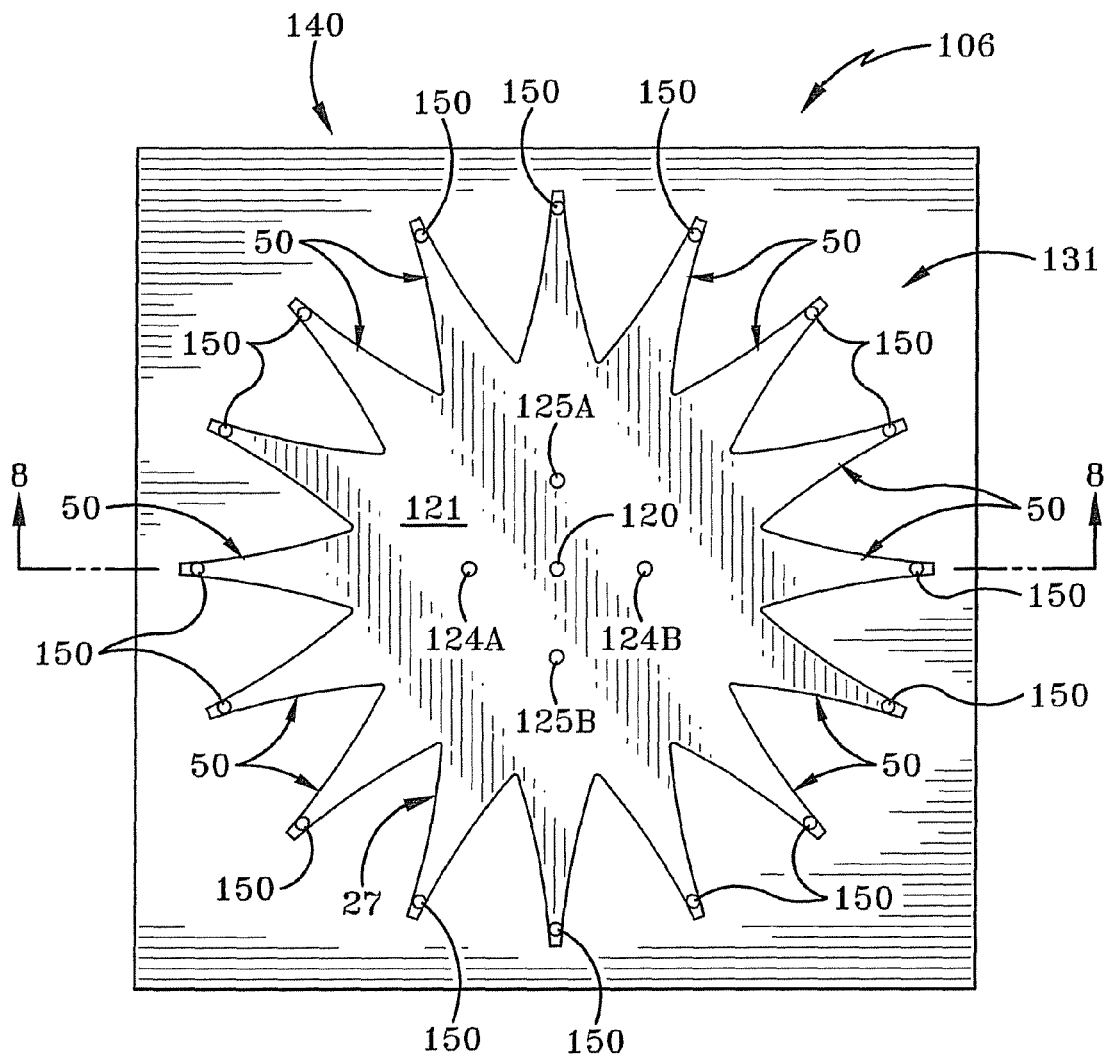
FIG. 9 is the top view of a planar microstripline tri-mode cavity of the preferred embodiment of the planar tri-mode cavity of a beamformer.

Returning to the preferred embodiment, FIG. 8 illustrates a side view and FIG. 9 a top view, of the planar microstripline tri-mode cavity 106 of the beamformer 100. The planar tri-mode cavity 106 in FIG. 9 can be fabricated to function at L-band. The measured output probe voltages are presented in FIG. 10. Output probes voltage measured (dB) at 1.030 and 1.090 GHz are plotted versus probe number. TE 124A-B, 125A-B and TEM 120 mode inputs were fixed. The output voltages measured from the planar tri-mode cavity 106 are very similar to those voltages measured from prior art tri-mode cavities.

As shown in FIG. 8, the metal layer 121 is deposited on top of dielectric material 130 that has a thickness H. The metal layer 121 and dielectric 130 can be formed as a printed circuit board (PCB) 140. The thickness of the dielectric material 130 and the relative permittivity of the dielectric material 130 can also contribute to the efficiency of the planar tri-mode cavity 106. In the preferred embodiment, a ground plane 131 can be deposited to the bottom of the dielectric material 130. The ground plane 131 and dielectric material 130 may extend beyond outer star points 52 of the starburst pattern of the planar tri-mode cavity 106. The planar tri-mode cavity can also include a TEM input node 120, a couple of pairs of TE input ports 124A-B, 125A-B and output ports 150.

Figure 11:
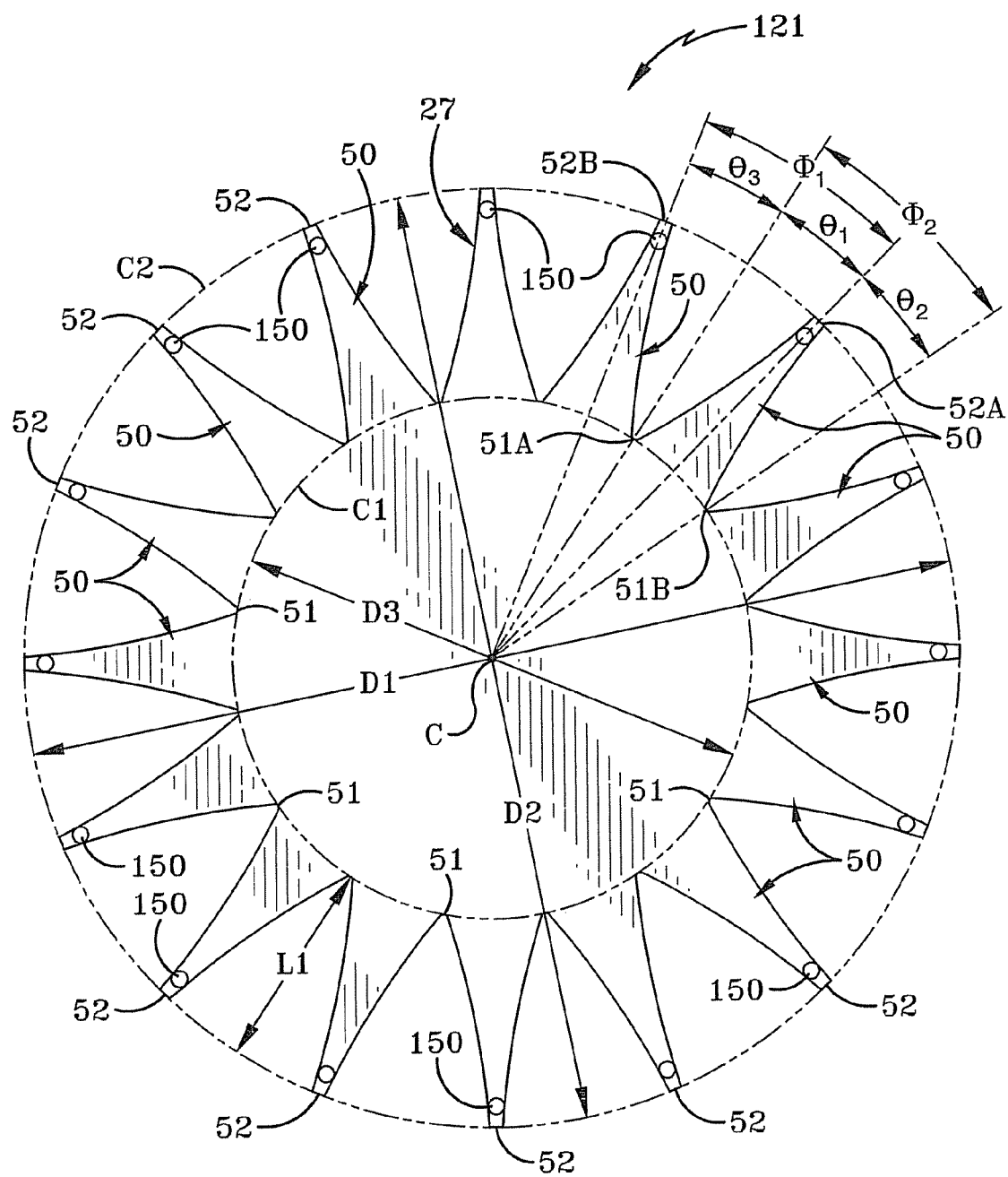
FIG. 11 is a detailed view of a planar tri-mode cavity of the preferred embodiment of the planar tri-mode cavity of a beamformer.

Referring to FIG. 11, the starburst shape of the planar tri-mode cavity can be a star shape 27 with star points 50 arranged in an oval pattern. For example, the diameters D1 and D2 shown in FIG. 4 are of similar lengths which results in the shape 27 that is circular as shown by circles C1 and C2. However, if diameters D1 and D2 have different lengths then the shape 27 would be more elliptical. In the preferred embodiment, the star points 50 are spaced equal circumferential distances from each other in the circular pattern. The star points 50 may have tips 52 and bases 51 between adjacent star points 50. The star tips 52 can lie on the circle C2 with a diameter D2 and the star bases 51 can lie on the smaller circle C1 with a diameter D1. Circles C1 and C2 are concentric with a common center C in the preferred embodiment. In the preferred embodiment, the star shape will have about 16 star points and the a length from one of the bases 51 to a tip 52 of a corresponding star point 50 has a length (L1) that is about one half the radius R1 of the circle with Diameter D1. In another embodiment of the preferred invention, the star tips 52 may be rounded tips. The star shaped 27 can also resemble a sinusoidal waveform shape that has been bent into a circular shape where each star point can additionally be elongated.

As also shown in FIG. 11, in the preferred embodiment, the angle $\theta_1$ between one star tip 52A and an adjacent star base 51A on one side of the star tip 52A is similar to the angle $\theta_2$ between the same star tip 52A and the star base 51B on the other side of the star tip 52A. The angle $\theta_1$ between one star base 51A and an adjacent star tip 52A is similar to the angle $\theta_3$ between the same star base 51A and the star tip 52B on the other side of the star base 51A. Additionally, the angle $\phi_1$ between two adjacent start tips 52A, 52B is similar to the angle $\phi_2$ between two adjacent star bases 51A, 51B. Of course those of ordinary skill in the art will realize that other angles, diameters, lengths and dimensions could be used.

Figure 12:
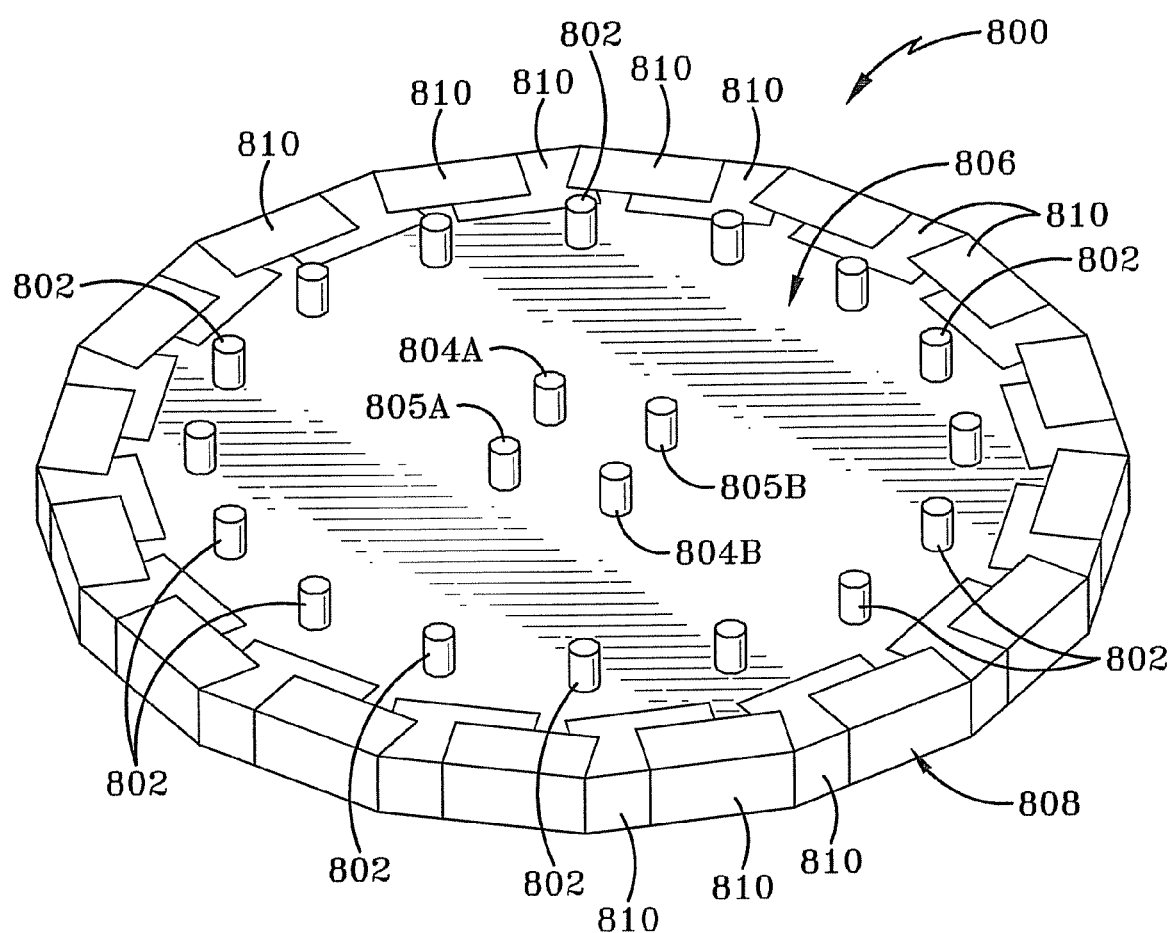
FIG. 12 illustrates a second embodiment of a radio frequency-isolated, circular planar tri-mode cavity of an antenna beamformer with the output probes coupling directly through the cavity on its outer perimeter.

Since the rays of the sunburst planar tri-mode cavity 106 of the beamformer 100 are sensitive to field distortion from objects that are in proximity to the starburst, a second embodiment of a planar cavity was formed as an enclosed planar tri-mode cavity 800 as in FIG. 12 was fabricated and tested. In this embodiment the rays (arms) of the starburst shape of the preferred embodiment of the planar tri-mode cavity 106 were removed and the circler center portion was made with a larger diameter. The cavity 800 can be formed with a copper layer 806 placed over a dielectric layer with a second copper layer formed on the bottom of the dielectric layer. TE mode inputs 804A/B and 805A/B are positioned near the center of the cavity 800. A TEM input may also be located at the center of the cavity 800. The output ports 802 were placed in line with a circumference with a radius that is λ/4 distance from the edge 808 of the circle which was closed electrically with copper tape 810.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 13:
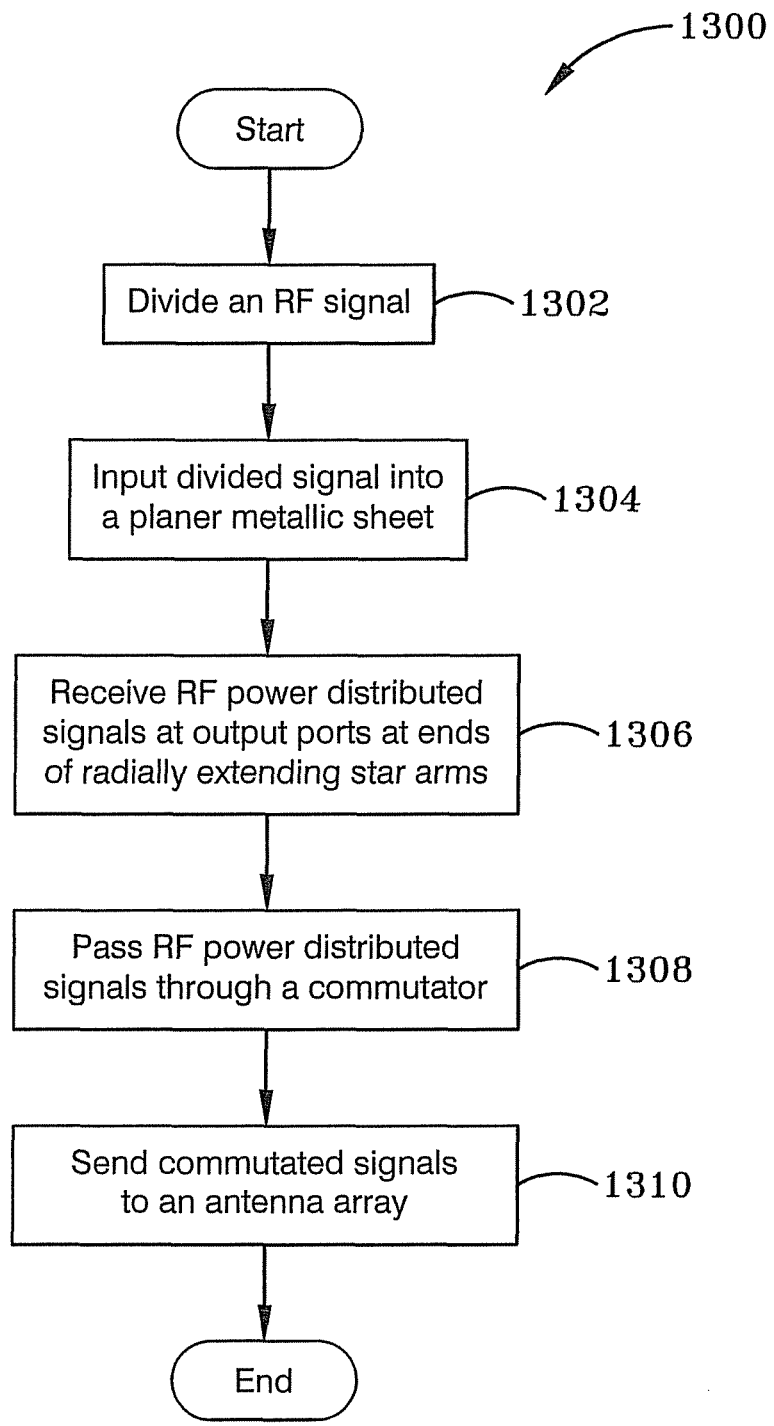
FIG. 13 illustrates an embodiment of a method of beamforming using a planar tri-mode cavity.

FIG. 13 illustrates a method 1300 of beam forming. The method divides a radio frequency (RF) signal, at 1302, to produce divided signals. RF power distributed signals are generated based, at least in part, on the divide signals. The RF power distributed signals are generated by inputting, at 1304, the divided signals into a center portion of a planar metallic sheet of metal shaped as a star with radially extending arms extending around the center portion. The RF power distributed signals are received, at 1306, at output ports located at ends of the radially extending arms. The method 1300 passes the RF power distributed signals through a commutator, at 1308, to produce commutated signals and then send the commutated signals to an antenna array for transmission, at 1310.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A power distribution cavity comprising:
    a planar cavity comprised of a thin planer metallic sheet with a top side and a bottom side in the shape of a star pattern with a plurality of elongated star arms extending from a round center portion of the thin planer metallic sheet;
    a plurality of input ports attached to the round center portion of the thin planer metallic sheet for receiving or transmitting a signal;
    output ports attached near outward ends of the elongated star arms, wherein the planar cavity is configured to propagate electromagnetic fields excited at the input ports to the output ports, and wherein the thin planer metallic sheet forms a plane with the plurality of input ports attached to the plane and the output ports attached to that same plane.

2. The power distribution cavity of claim 1 further comprising:
    a sheet of dielectric material with the thin planer metallic sheet located on a top surface of the dielectric material; and
    a sheet of metal forming a ground plane located under the sheet of dielectric material.

3. The power distribution cavity of claim 2 wherein the sheet of dielectric material and the sheet of metal forming a ground plane extend outwardly beyond the outward ends of the elongated star arms.

4. The power distribution cavity of claim 1 wherein the plurality of input ports comprise:
    a transverse electromagnetic mode (TEM) input located near a center of the star pattern, configured to receive a TEM signal;
    a first transverse electric (TE) mode input comprised of a pair of diametrically located port with opposing polarities positioned near the center portion of the star pattern to receive a first TE signal;
    a second TE input located near the center portion of the star pattern to receive a TE signal that is a phase shifted version of the first TE signal.

5. The power distribution cavity of claim 1 wherein the elongated star arms extend outward from the round center portion of the metallic sheet in an oval pattern.

6. The power distribution cavity of claim 5 wherein the star ends are spread out equal circumferential distances from each other in the oval pattern.

7. The power distribution cavity of claim 5 wherein the plurality of star ends is arranged in a circle with the star ends lying on the circle, 8. The power distribution cavity of claim 5 wherein the plurality of elongated star arms comprises 16 elongated star arms.

9. The slot antenna of claim 1 wherein the metallic sheet is a sheet of copper on a printed circuit board (PCB).

10. A beam forming system comprising:
an array of antennas;
a modal power divider configured to partition a radio frequency (RF) input to generate divided RF signals to excite different RF modes within a tri-mode cavity;
wherein the tri-mode cavity comprises a flat planar metallic sheet with a flat upper surface and a flat lower surface, wherein the flat planar metallic sheet is shaped in a star-burst pattern with a center portion and with a plurality of elongated star arms extending outward from the center portion;
a plurality of input ports connected to the center portion of the star-burst pattern of the flat planer metallic sheet to receive the divided RF signals;
a plurality of output ports connected to generally pointed endpoints of the plurality of elongated star arms extending outward from the center portion, wherein the plurality of output ports are configured to receive exited electromagnetic fields generated by the tri-mode cavity; and
a commutator configured to receive signals from the plurality of output ports to produce array antenna excitations and to switch the array antenna excitations onto the array of antennas to transmit a beam signal in a prescribed direction.

11. The beam forming system of claim 10 further comprising:
a dielectric sheet, wherein the planar metallic sheet is a planar metal sheet deposited on one side of the dielectric sheet.

12. The beam forming system of claim 10 wherein the plurality of elongated star arms generally are generally tapered with a cross-section that is narrows from the center portion of the flat planar metallic sheet to the generally pointed endpoints of the elongated star arms.

13. The beam forming system of claim 10 wherein the modal power divider further comprises:
a balun configured to generate a pair of transverse electric (TE) mode inputs from the RF input and wherein the divided RF signals comprises the pair of TE mode inputs.

14. The beam forming system of claim 10 wherein the planar metal flat sheet is a planar sheet of copper.

15. A method of beam forming comprising:
dividing a radio frequency (RF) signal to produce divided signals;
generating RF power distributed signals based, at least in part, on the divided signals, wherein generating the RF power distributed signals comprises:
inputting the divided signals into a center portion of a thin flat planar metallic sheet with a top surface and a bottom surface, wherein the then flat planar metallic sheet is shaped as a star with radially extending arms that extend outward from the center portion; and
receiving the RF power distributed signals at output ports located at ends of the radially extending arms;
passing the RF power distributed signals through a commutator to produce commutated signals;
sending the communtated signals to an antenna array.

16. The method of claim 15 wherein the passing the RF power distributed signals through the commutator further comprises:
passing the RF power distributed signals through phase adjustment device to produce phase adjusted signals; and
passing the phase adjusted signals through switches to produce the commutated signals.

17. The method of claim 15 wherein the passing the phase adjusted signals through switches further comprises:
passing the phase adjusted signals through single pole 4 throw (SP4T) switches.

18. The method of claim 15 wherein the dividing the RF signal to produce divided signals further comprises:
generating a transverse electromagnetic (TEM) signal, wherein the divided signals include the TEM signal; and
generating a pair of transverse electric (TE) mode signals, wherein the divided signal include the pair of TE mode signals.

19. The method of claim 18 wherein the generating a pair of TE mode signals further comprises:
generating the pair of TE mode signals with a balun.

20. The method of claim 15 wherein the inputting the divided signals further comprises:
receiving the power distributed signals at output ports located at the ends of the radially extending arms where the radially extending arms are generally equally radially spaced apart with the ends of the radially extending arms generally forming a circle pattern.

* * * * *